United States Patent Office 3,450,795
Patented June 17, 1969

3,450,795
NOVEL COPOLYMERS AND THE PROCESS
FOR PRODUCING THEM
Arthur W. Langer, Jr., Watchung, N.J., assignor to Esso Research and Engineering Company, a corporation of Delaware
No Drawing. Continuation-in-part of application Ser. No. 266,188, Mar. 19, 1963. This application Feb. 19, 1965, Ser. No. 434,103
Int. Cl. C08f 1/28, 15/22, 15/04
U.S. Cl. 260—878          13 Claims

ABSTRACT OF THE DISCLOSURE

Block copolymers of ethylene and an anionically polymerizable polar monomer are prepared by sequential polymerization employing, as a catalyst, a combination of an organometal and a chelating Lewis base.

---

This invention relates to novel linear copolymers of ethylene and polar monomers and the method for producing them. The present application is a continuation-in-part of application Ser. No. 266,188, filed Mar. 19, 1963, now abandoned in favor of successor application Ser. No. 589,240, filed Oct. 25, 1966.

The block copolymerization of ethylene with polar monomers is old in the art. However, prior block copolymers were produced with the use of free radical catalysts such as peroxides, and resulted in copolymers containing a substantial amount of branched segments. It has now been found that with the use of a specific type of catalyst, block copolymers of ethylene and selected polar monomers can be produced which are linear (unbranched) in nature. Linear block copolymers have, among other improved properties, generally greater strength, greater rigidity and greater solvent resistance than branched copolymers. They are normally thermoplastic materials which are useful, for example, in the production of films and molded items. Those copolymers which contain diolefins can be cross-linked to become thermosetting.

Briefly stated, the present invention is accomplished in two steps. First, ethylene is polymerized with a catalyst composed of a selected organometal compound and a bifunctional Lewis base. The "living polymer" thus produced is then contacted with a polar monomer to form a linear block copolymer. Additional blocks of different polar monomers may then be attached to this copolymer if desired.

The catalyst system of this invention is composed of two components, an organometal and a bifunctional Lewis base which is capable of forming a chelate complex with the organometal. The organometal is either RLi or R$_2$Mg Where R may be the same or different monovalent hydrocarbon radicals of 2 to 20 carbon atoms. Examples of suitable R groups include aryl radicals and aliphatic radicals or derivatives such as alkyl cycloalkyl-alkyl, cycloalkenyl-alkyl, aryl-alkyl, cycloalkyl, aryl-cycloalkyl, cycloalkyl alkenyl, alkyl-aryl or cycloalkyl-aryl radicals and the like.

Specific examples of R groups for substitution in the above formula include ethyl, n-propyl, isopropyl, n-butyl, isobutyl, t-butyl, n-amyl, isoamyl, n-hexyl, n-octyl, n-decyl, and the like; allyl, 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl, and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcylclohexyl, isopropylcyclohexyl, 5-cyclopentadienyl, and the like; phenylcyclopentyl, phenylcyclohexyl, the corresponding naphthyl derivatives of cycloalkyl groups, and the like; phenyl, tolyl, xylyl, ethylphenyl, naphthyl, methylnaphthyl, dimethylnaphthyl, ethylnaphthyl, cyclohexylphenyl and the like.

Preferably, the first component is an alkyl magnesium or alkyl lithium wherein the alkyl radical contains 2 to 10 carbon atoms. Particularly preferred herein is n-butyl lithium.

The second component of the catalyst system of this invention comprises a chelating bifunctional Lewis base which is selected from the group consisting of di-(tertiary)-amines and tertiary aminoethers having the following general formulas:

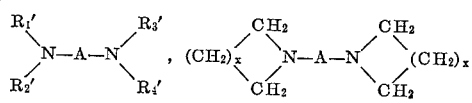

and

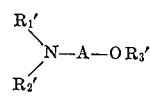

wherein R$_1'$, R$_2'$, R$_3'$ and R$_4'$ are the same or different alkyl radicals of 1 to 4 carbon atoms inclusive, A is a nonreactive group and $x$ is an integer of 0 to 3, inclusive.

For the purposes of this invention, A in the above formulas, is selected from the group consisting of: (1) cycloaliphatic radicals and their lower alkyl derivatives having ring structures containing 5 to 7 members, wherein said radicals are attached to the nitrogen atoms at adjacent positions on the rings; suitable examples include N,N,N',N'-tetramethyl-1,2-cyclopentanediamine, N,N,N', N'-tetramethyl-1,2-cyclohexanediamine, 4-ethyl - N,N,N', N'-tetramethyl-1,2-cyclohexanediamine, and the like; (2) a monoethylenic radical, said radical containing 0 to 2 monovalent hydrocarbon radicals of 1 to 8 carbon atoms; suitable examples include, N,N,N',N'-tetramethyl-1,2-diaminoethylene, N,N,N',N'-tetramethyl-3,4-diaminohexene-3, and the like; and (3) 1 to 4 methylenic radicals inclusive, wherein each methylenic radical contains 0 to 2 monovalent hydrocarbon radicals of 1 to 4 carbon atoms; suitable examples include 1,2-dipiperidyl ethane, N,N'-dimethyl-N,N'-diethyl-1,2-ethanediamine, N,N,N',N'-tetramethyl-1,2-pentanediamine, N,N,N',N'-tetramethyl-1,2-propanediamine, N,N,N',N' - tetramethyl - 2,3-butanediamine, N,N,N',N'-tetramethyl-1,4-butanediamine, methyl beta-dimethylaminoethyl ether, ethyl beta-diethylaminoethyl ether, and the like.

Particularly valuable as a third component is an organic diamine having the general formula:

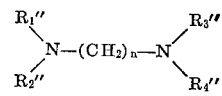

wherein R$_1''$, R$_2''$, R$_3''$ and R$_4''$ are the same or different alkyl radicals of 1 to 3 carbon atoms inclusive and $n$ is an integer between 1 and 4, inclusive. Suitable examples include: N,N,N',N'-tetramethylmethanediamine, N,N-dimethyl-N',N'-diethyl-1,2-ethanediamine, N,N,N',N'-tetramethyl-1,2-ethanediamine, N,N,N',N'-tetraethyl-1,2-ethanediamine, N,N,N',N'-tetramethyl-1,3-propanediamine, N,N,N',N'-tetramethyl-1,4-butanediamine, and the like. Particularly preferred herein is N,N,N',N'-tetramethyl-1,2-ethanediamine.

In preparing and using catalysts according to this invention, all steps should be carried out in the absence of moisture and preferably also in the absence of oxygen or other harmful impurities. This may be readily done by blanketing the materials with an inert gas, such as dry nitrogen or argon. The raw materials, i.e. both the reactants and inert liquids, may be preferably purified or otherwise treated to remove traces of moisture, oxygen, carbon dioxide and other catalyst poisons. It is generally desirable that the monomer stream should contain less than about 200 p.p.m. and the inert liquid less than about 50 p.p.m. by weight of the aforementioned impurities.

In practicing one embodiment of this invention, it is generally desirable to prepare the catalyst system by mixing the selected organometal (i.e., the first component) with the selected bifunctional Lewis base. Although a catalyst system comprising one organometal and one bifunctional base is preferred, mixtures of organometals and bifunctional Lewis bases may also be employed. Generally, the molar ratio of the organometal to the bifunctional Lewis base is about 0.1:1 to 10:1, preferably 0.8:1 to 2:1.

As a matter of convenience, it is generally preferred to mix the catalyst components in the presence of an inert organic diluent. The diluent, which can also serve as the polymerization medium, should be a liquid at the This diluent should be a saturated aliphatic or saturated cycloaliphatic hydrocarbon having 2 to 20 carbon atoms such as pentane, hexane, heptane, isooctane, cyclopentane, cyclohexane, decane, hexadecane, and the like.

Although the concentrations of the catalyst components are not critical, sufficient amounts of the diluent are preferably employed such that the concentration of the catalyst is normally in the range of 0.1 to 50 g./l., preferably 0.5 to 20 g./l. of the diluent. As a matter of convenience, the individual catalyst components may be diluted prior to mixing. Standardized solutions of each catalyst component may be employed wherein the concentration of each solution is in the range of 0.1 to 5 Normal, preferably 1 to 4 Normal.

Although the temperatures required for the catalyst preparation are not critical in the range −50° to +100° C., it is desirable to prepare the catalyst at temperatures ranging from 0 to 100° C., most preferably at temperatures in the range of 10 to 80° C. Since the catalyst components, after mixing, normally result in a liquid mixture, the catalyst can conveniently be prepared at atmospheric pressure.

The catalyst described above is preferably contacted in the first step of this invention with ethylene. Homologues of ethylene such as propylene and 1-butene are not suitable as a first reactant in this invention because they contain allylic hydrogen which reacts with the highly active catalyst to form such compounds as allyl lithium thus exhausting the catalyst before polymerization can take place. With some polar monomers, such as styrene or butadiene, the polar block may be made first but generally it is preferred to add the polar block to the polyethylenyl-lithium.

The polar monomers which can be used in this invention are those monomers which can be anionically polymerized. Thus they include a wide variety of monomers, typical of which are acrylonitrile, methyl methacrylate, styrene, butyl acrylate, conjugated diolefins such as butadiene, isoprene, piperylene, cyclohexadiene-1,3 and 1-phenylbutadiene-1,3. Preferred are acrylonitrile, styrene, and buptadiene. Most preferred is acrylonitrile.

Those polar monomers which are not anionically polymerizable are not useful in this invention. Thus, for example, vinyl chloride which can be polymerized with butyllithium only in the presence of oxygen (which produces a free radical rather than an anionic catalyst system) cannot be used herein. Similarly vinylidene chloride is not useful.

In the first step of this process, the catalyst is placed in the reactor and ethylene is injected thereinto. Although ethylene may be polymerized in the absence of diluent, if no diluent has been employed in the catalyst preparation, it is desirable to add sufficient amounts of a diluent such as n-heptane prior to injection of the ethylene. High ethylene concentrations are preferred and when a diluent is used in the polymerization reaction, the minimum ethylene concentration in the diluent should be about 5 weight percent, preferably 10 weight percent, based on the weight of diluent. The polymerization reaction is then carried out at a temperature of about 0 to 100° C., preferably 20 to 80° C. Ethylene is allowed to remain in contact with the catalyst system for about 0.1 to 10 hours, preferably 0.5 to 4 hours, during which time more ethylene may be added so as to maintain the total pressure at the desired level which may be as low as atmospheric and as high as 6,000 p.s.i.g. or higher if necessary, but preferably is in the range of 500 to 5,000 p.s.i.g.

The amount of ethylene added will, of course, be determined by the age of the catalyst, reaction time, diluent volume, desired monomer conversion, etc., but may advantageously be in the range of about 50 g. to about 50 g. to about 5000 g. monomer per g. total catalyst when the reaction is carried out batchwise. Normally it is desirable for good operability to limit the concentration of polymer in the diluent to less than 25 weight percent. If necessary, the polymer concentration may be maintained at or below this level by the addition of more diluent during the polymerization reaction.

The polar monomer is polymerized at substantially similar conditions although the temperature is ordinarily decreased, the exact temperature depending on the conditions of polymerization as well as the monomer used. Thus for the copolymerization of butadiene, about room temperature is satisfactory, while for the copolymerization of methyl methacrylate a suitable temperature is in the range of 0° to −80° C.

In some cases, when a sensitive polar monomer is added to the polyethylenyl-lithium, undesirable side reactions may occur which destroy the living polymer and prevent the formation of block copolymers. This difficulty can be circumvented by adding at least a sufficient amount of another monomer to convert the polyethylenyl-lithium (which contains a primary alkyl carbanion structure) to a polymer-lithium species having a less reactive carbanion. The latter should have sufficient reactivity to initiate polymerization of the desired polar monomer but without causing chain terminating side reactions. For example, when a block of acrylonitrile is to be added to the polyethylenyllithium, it is preferred first to add a monomer, such as butadiene, to convert the living chain ends to butadienyl anions. The general principle is to "step down" the activity of the growing carbanion to eliminate the effects of excessive reactivity during the initiation of the polar monomer. Thus any monomer may be used which can add a primary alkyl carbanion and form a new terminal carbanion of intermediate reactivity between that of the primary alkyl carbanion and the carbanion to be formed from the polar monomer. Examples include butadiene, styrene, 1,1-diphenylethylene, etc. The products formed under these conditions contain three blocks, of which the first is always linear polyethylene. Of course the second monomer and the size of its block are selected to impart additional desirable properties.

At the end of the reaction, the solid polymer is precipitated with about 0.1 to 100 volumes of a $C_1$ to $C_6$ alcohol such as methyl, alcohol, isopropyl alcohol, n-butyl alcohol, and the like. The precipitated product is then filtered and washed with more alcohol or other suitable solvents and may then be finished by the addition of suitable stabilizers, followed by drying.

In practicing another embodiment of this invention, the catalyst is prepared by mixing the catalyst components, i.e., the organolithium or organomagnesium compound and the bifunctional Lewis base, as described hereinabove. The resultant catalyst mixture is then allowed to age for a period of about 10 minutes to several months or longer, preferably 1 to 60 days, prior to its use in the polymerization reaction. If desired, the aging of the catalyst may be hastened by heating the catalyst mixture at about 30° to 120° C., preferably 40° to 80° C., for about 5 minutes to 10 days.

The linear block copolymers prepared by this invention have Chiang molecular weights in the range of 10,000 to 1,000,000 or higher. They range in appearance from hard plastics to tough materials having some rubbery characteristics.

The invention may be more fully understood by reference to the following examples.

EXAMPLE 1

Block copolymerization of ethylene with butadiene and styrene

A catalyst was prepared which was composed of 0.004 mole butyllithium and 0.004 mole of N,N,N',N'-tetramethyl-1,2-ethanediamine (TMEDA). This catalyst was dispersed in 25 ml. of n-heptane. In one experiment 14 g. butadiene in 500 ml. n-heptane was contacted with the catalyst for 24 hours at 25° C. to obtain polybutadienyl-lithium·TMEDA. In the second experiment, 5 ml. styrene in 700 ml. n-heptane was contacted with the catalyst for ca. ¼ hour at 25°–40° C. to obtain polystyryl-lithium·TMEDA. Ethylene was then added to these "living" polymers in a 2 l. autoclave for 3–4 hours at 40° C. and 2000 p.s.i.g. ethylene pressure. The results are shown in the following table:

TABLE I

| Ethylene copolymer | Percent polymer yield based on styrene or butadiene | I.V. in Decalin at 135° C., dl./g. | Percent ethylene in copolymer by quantitative I.R. |
|---|---|---|---|
| Styrene | 49 | 0.28 | 56 |
| Butadiene | 60 | 0.10 | 10 |

Fractionation studies were then undertaken to determine whether these copolymers are true copolymers or merely mixtures of homopolymers. These fractionation studies were accomplished with the use of carbon disulfide. The $CS_2$ soluble portion (17.5% total) showed no evidence of polyethylene in the 13.7μ and 13.9μ I.R. bands. Additionally, the existence of low molecular weight polystyrene was not shown by the I.R. analysis indicating that very little styrene homopolymer (which is soluble in $CS_2$) was produced in the reaction. The $CS_2$ insoluble portion (82.5% of the total) showed strong polyethylene bands and evidence for polystyrene, e.g. in the 9.7μ and 6.2μ bands. Thus it is concluded that this product is substantially a block copolymer of styrene and ethylene.

The butadiene-ethylene polymers were also extracted with $CS_2$ to remove any homopolybutadiene. The insoluble portion (about 100%) showed strong polybutadiene I.R. bands proving that copolymerization had been achieved. The polyethylene I.R. bands were typical of linear, crystalline polymer indicating that the product was predominantly linear block copolymer rather than a random or branched copolymer.

This example demonstrates that a linear polyethylene block can be added to either "living" polybutadiene or polystyrene when using the catalysts of this invention. These results are very surprising in that resonance stabilized carbanions initiated ethylene polymerization to form the more reactive primary alkyl carbanion.

EXAMPLE 2

Copolymerization of mixtures of ethylene and styrene or butadiene

The procedure of Example 1 was repeated except that the catalyst was added to the mixture of monomers at 2000 p.s.i.g. In this example, 12 g. of styrene or butadiene was used. Results are shown in Table II.

TABLE II

| Ethylene Comonomer | Percent polymer yield based on styrene or butadiene | I.V. in Decalin at 135° C., dl./g. | Percent ethylene in copolymer |
|---|---|---|---|
| Styrene | 50 | 0.16 | 9 |
| Butadiene | 135 | 0.22 | 60 |

Fractionation studies again showed that the products were predominantly copolymers and that the styrene and butadiene moieties were present to a large extent as blocks.

In a similar set of experiments, 80 g. butadiene or 58 g. styrene, 700–900 p.s.i.g. ethylene and 8 mmoles catalyst were used. The catalyst was added in increments during the run. The data are summarized in Table III.

TABLE III

| Ethylene comonomer | Percent polymer yield based on styrene or butadiene | I.V. in Decalin at 135° C. dl/g. | Percent ethylene in copolymer based on— I.R. | Yield |
|---|---|---|---|---|
| Styrene | 87 | 0.25 | Present | |
| Butadiene | 121 | 0.53 | 3.2 | >17 |

The ethylene-butadiene copolymer was fractionated by extraction with carbon disulfide. Both the soluble and insoluble fractions showed 3–4% ethylene based on infrared absorption at 13.9μ. Since the 13.9μ absorption only measures methylene sequences of six or longer and since the yield indicates a much larger amount of ethylene is present, the major proportion of the ethylene must have been present as isolated units.

This example demonstrates that mixtures of ethylene and butadiene or styrene can be copolymerized with the catalysts of this invention to produce block copolymers. Also, in the case of ethylene-butadiene it is possible to make copolymers in which the major proportion of the ethylene is present in essentially random or very short block lengths.

EXAMPLE 3

Block copolymerization of butadiene with ethylene

A catalyst was prepared by mixing 0.006 mole butyllithium and 0.006 mole TMEDA in 12 ml. benzene for 15 minutes at 25° C. The reactor was charged with 200 ml. benzene and pressured to 800 p.s.i.g. with ethylene at 30° C. The catalyst solution was pressured into the reactor and the pressure was maintained at 750–950 p.s.i.g. at 40° C. for 2 hours. The reactor contents were chilled to 0° C. and the ethylene was vented. A solution of 25 g. butadiene in 200 ml. benzene was then added and the mixture was heated to 35°–50° C. for 1 hour. The product was coagulated with methanol and vacuum dried. The yield was 38.7 g., equal to 155% based on butadiene. Infrared analysis indicated that the product contained 65% polybutadiene consisting of 80.4% pendant vinyl, 10.0% trans and 9.6% cis unsaturation. Intrinsic viscosity was 0.37. The product consisted predominantly of block copolymer having one large block of each monomer.

EXAMPLE 4

Copolymerization of ethylene and acrylonitrile

Ethylene was polymerized at 40°–50° C. and 1000–2000 p.s.i. for several hours using the butyl lithium-TMEDA catalyst system. This was accomplished in an autoclave. The autoclave was then vented slowly without terminating the reaction and cooled to −50° C. A solution of acrylonitrile (0.2 moles, 13.2 ml./20° C.) in 112 ml. toluene was chilled to −50° C. and then added to the autoclave. Reaction was allowed to continue for 25 minutes and was then terminated by adding 2 ml. concentrated HCl in 15 ml. of acetone. The product was then allowed to stand overnight. A pale yellow powdered polymer was obtained and this was washed with alcohol plus triethylamine to remove HCl and then blended in a "Waring Blendor" with acetone. The polymer was dried at 60° C. for 16 hours in a vacuum oven. The yield was 26.5 grams. It contained 0.89% nitrogen and had an intrinsic viscosity of 0.35.

Fractionation studies with dimethyl formamide indicated that a true copolymer was formed, and I.R. analysis indicated that this was of a linear block type.

EXAMPLE 5

To show that propylene cannot be polymerized in the first step of this process, the following experiments were done.

To a glass unit was charged 200 ml. n-heptane at −50° C. and 42 g. propylene was added. A solution of 0.004 mole BuLi-TMEDA catalyst in 15 ml. heptane was added. After 1 hour there was no evidence of reaction and an additional 0.004 mole catalyst was added and the solution was heated to +40° C. for 2 hours. Precipitation with alcohol yielded 0.68 g. of brittle solid which was largely catalyst residues. Infrared analysis showed no polypropylene.

In a pressure experiment, 0.05 mole BuLi-TMEDA catalyst was added to a solution of 50 g. propylene in 50 ml. n-heptane at 60° C. After 1 hour, the temperature was raised to 120° C. for 1 hour. Alcohol was added to kill the catalyst and the solution evaporated. Only catalyst residues were isolated (0.2 g.). Therefore, no propylene polymerization was obtained over the temperature range −60° to −120° C.

EXAMPLE 6

To show vinyl chloride, which is an example of a polar monomer which is not useful in this invention, cannot be polymerized with anionic catalysts, this monomer was contacted for up to 16 hours with butyl lithium or butyl lithium-TMEDA catalysts at temperatures which ranged from 0 to −78° C.; atmospheric pressure was used. In most cases no polymer at all was produced and in one case after 16 hours at 0° C. temperature, 0.1 gram was produced. However, when air was added to this system at atmospheric pressure and 0°C., after 21 hours 1.54 grams of polymer were produced.

Thus it is clear that the vinyl chloride is not an anionically polymerized polar monomer since it could be polymerized only in the presence of oxygen which formed a free radical type catalyst.

When ethylene was polymerized with the catalyst of this invention and vinyl chloride was added to this "living polymer," substantially no block copolymerization occurred.

This invention has been described in connection with certain specific embodiments thereof; however, it should be understood that these are by way of example rather than by way of limitation, and it is not intended that the invention be restricted thereby.

What is claimed is:

1. A process for preparing linear block copolymers of ethylene and polar monomers which comprises first polymerizing ethylene in the presence of a catalyst and then sequentially contacting the resulting polymer with at least one anionically polymerizable polar monomer, said catalyst comprising (a) an organometal which is selected from the group consisting of RLi and $R_2Mg$, wherein R is a monovalent hydrocarbon radical containing 2 to 20 carbon atoms, and (b) a chelating bifunctional Lewis base which is selected from the group having the general formulas:

$$\begin{array}{c} R_1' \\ \diagdown \\ N-A-N \\ \diagup \\ R_2' \end{array} \begin{array}{c} R_3' \\ \diagup \\ \\ \diagdown \\ R_4' \end{array} , \quad (CH_2)_x \begin{array}{c} CH_2 \\ \diagup \\ N-A-N \\ \diagdown \\ CH_2 \end{array} \begin{array}{c} CH_2 \\ \diagdown \\ \\ \diagup \\ CH_2 \end{array} (CH_2)_x$$

and $$\begin{array}{c} R_1' \\ \diagdown \\ N-A-OR_3' \\ \diagup \\ R_2' \end{array}$$

wherein $R_1'$, $R_2'$, $R_3'$ and $R_4'$ are alkyl radicals containing 1 to 4 carbon atoms, inclusive, x is an integer of 0 to 3, inclusive, and A is selected from the group consisting of: (a) cycloaliphatic radicals and their lower alkyl derivatives having ring structures containing 5 to 7 members, wherein said radicals are attached to the nitrogen atoms at adjacent positions on the rings; (b) a monoethylenic radical, said radical containing 0 to 2 monovalent hydrocarbon radicals of 1 to 8 carbon atoms; (c) 1 to 4 methylenic radicals inclusive, wherein each radical contains 0 to 2 monovalent hydrocarbon radicals of 1 to 4 carbon atoms.

2. The process of claim 1 wherein the organometal is a $C_2$–$C_{10}$ alkyl lithium.

3. The process of claim 2 wherein the bifunctional Lewis base is an organic tertiary diamine having the formula:

$$\begin{array}{c} R_1'' \\ \diagdown \\ N-(CH_2)_n-N \\ \diagup \\ R_2'' \end{array} \begin{array}{c} R_3'' \\ \diagup \\ \\ \diagdown \\ R_4'' \end{array}$$

wherein $R_1''$, $R_2''$, $R_3''$, and $R_4''$ are $C_1$–$C_3$ alkyl radicals and n is an integer of 1 to 4.

4. The process of claim 3 wherein the alkyl lithium is n-butyl lithium.

5. The process of claim 4 wherein the organic tertiary diamine is N,N,N',N'-tetramethylmethanediamine.

6. The process of claim 4 wherein the organic tertiary diamine is N,N,N',N'-tetramethyl-1,2-ethanediamine.

7. The process of claim 4 wherein the organic tertiary diamine is N,N,N',N'-tetramethyl-1,3-propanediamine.

8. The process of claim 4 wherein the organic tertiary diamine is N,N,N',N'-tetramethyl-1,4-butanediamine.

9. The process of claim 1 wherein ethylene is copolymerized with a polar monomer selected from the class consisting of butadiene, styrene, and acrylonitrile.

10. The process of claim 3 wherein ethylene is copolymerized with a polar monomer selected from the class consisting of butadiene, styrene, and acrylonitrile.

11. The process of claim 6 wherein ethylene is copolymerized with acrylonitrile.

12. The process of claim 6 wherein ethylene is copolymerized with butadiene.

13. The process of claim 6 wherein ethylene is copolymerized with styrene.

References Cited

UNITED STATES PATENTS

| | | | |
|---|---|---|---|
| 3,149,182 | 9/1964 | Porter | 260—879 |
| 3,189,664 | 6/1965 | Nozaki | 260—881 |
| 3,189,665 | 6/1965 | Nozaki | 260—881 |
| 3,254,140 | 5/1966 | Hagemeyer | 260—878 |
| 3,277,210 | 10/1966 | Mirabile et al. | 260—878 |
| 3,290,414 | 12/1966 | Anderson | 260—878 |

SAMUEL H. BLECH, *Primary Examiner.*

M. J. TULLY, *Assistant Examiner.*

U.S. Cl. X.R.

252—431